US 6,647,194 B1

(12) United States Patent
Kurosawa et al.

(10) Patent No.: US 6,647,194 B1
(45) Date of Patent: Nov. 11, 2003

(54) METHOD AND APPARATUS FOR ANCHORING OPTICAL FIBER

(75) Inventors: Yoshihiro Kurosawa, Ibaraki (JP); Shigeo Uchiyama, Ibaraki (JP)

(73) Assignee: Hitachi Cable, Ltd., Tokyo (JP)

( * ) Notice: Subject to any disclaimer, the term of this patent is extended or adjusted under 35 U.S.C. 154(b) by 81 days.

(21) Appl. No.: 09/680,906

(22) Filed: Oct. 6, 2000

(30) Foreign Application Priority Data

Oct. 7, 1999 (JP) .......................................... 11-286985

(51) Int. Cl.[7] .............................. G02B 6/02; G02B 6/22
(52) U.S. Cl. ...................................................... 385/128
(58) Field of Search ................................ 385/100, 128, 385/131

(56) References Cited

U.S. PATENT DOCUMENTS

| | | | | |
|---|---|---|---|---|
| 4,239,335 A | * | 12/1980 | Stiles | 385/128 |
| 4,753,500 A | * | 6/1988 | Guazzo | 350/96.2 |
| 5,355,429 A | * | 10/1994 | Lee et al. | 385/136 |
| 6,246,824 B1 | * | 6/2001 | Vandeberg et al. | 385/129 |

* cited by examiner

*Primary Examiner*—Javaid H. Nasri
(74) *Attorney, Agent, or Firm*—Antonelli, Terry, Stout & Kraus, LLP

(57) ABSTRACT

Substantially the same material as a jacket material of an optical fiber, for example, a UV-curable resin, is molded into a shape which covers the anchor position of an optical fiber and has a convex for facilitating anchoring. Ultraviolet light is then applied to cure the UV-curable resin to form a covering material. Since this covering material is substantially the same as the jacket material of the optical fiber, the adhesive strength between the optical fiber and the covering material is high. Further, there is no chemical adverse effect on the optical fiber to provide long-term reliability. By virtue of the above construction, there can be provided an optical fiber-anchoring method and an optical fiber-anchoring apparatus which can realize no significant transmission loss of the optical fiber, good long-term reliability, and satisfactory anchor force.

4 Claims, 6 Drawing Sheets

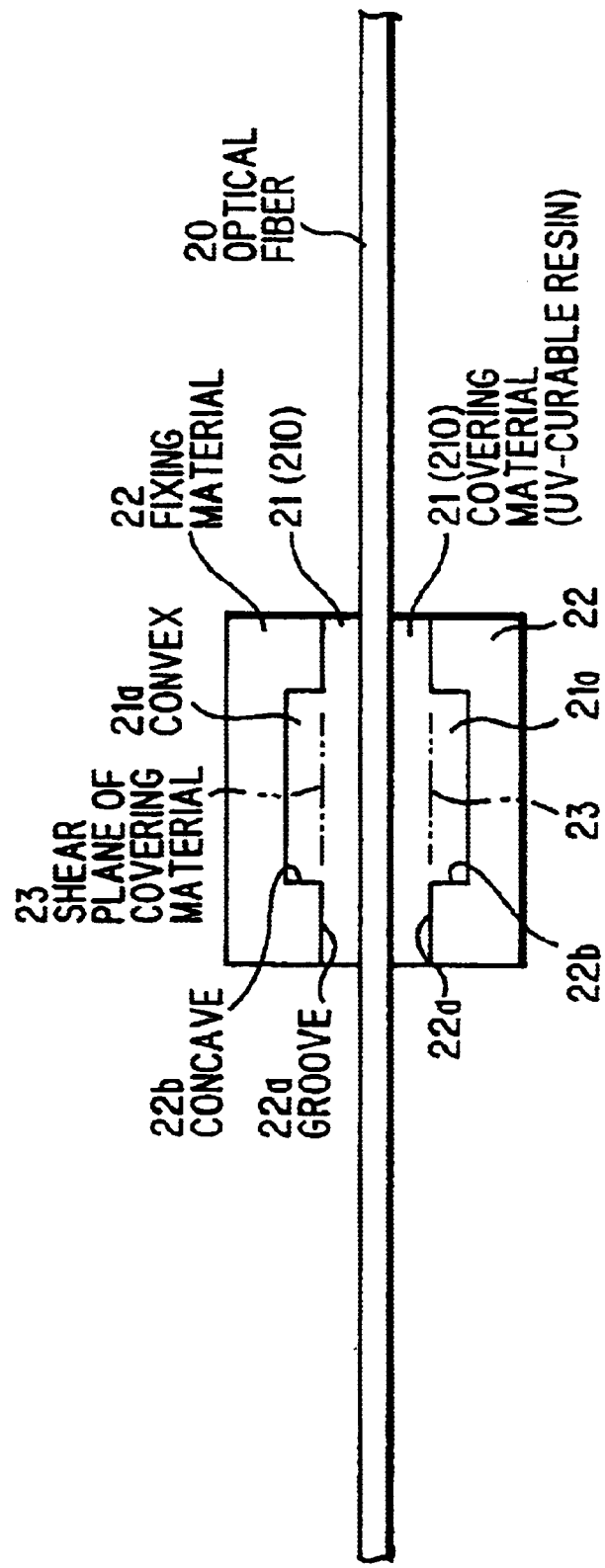

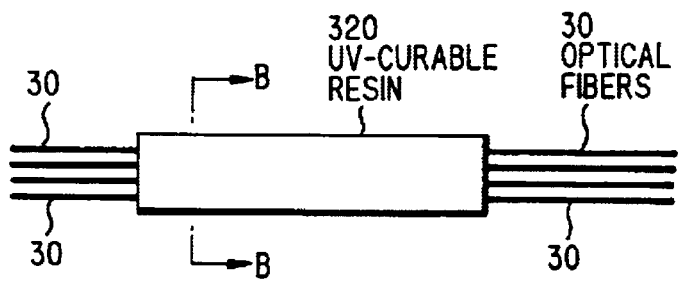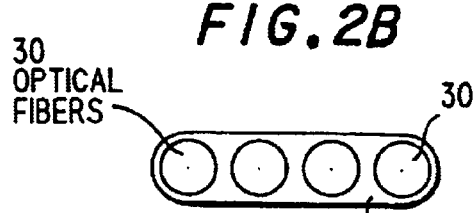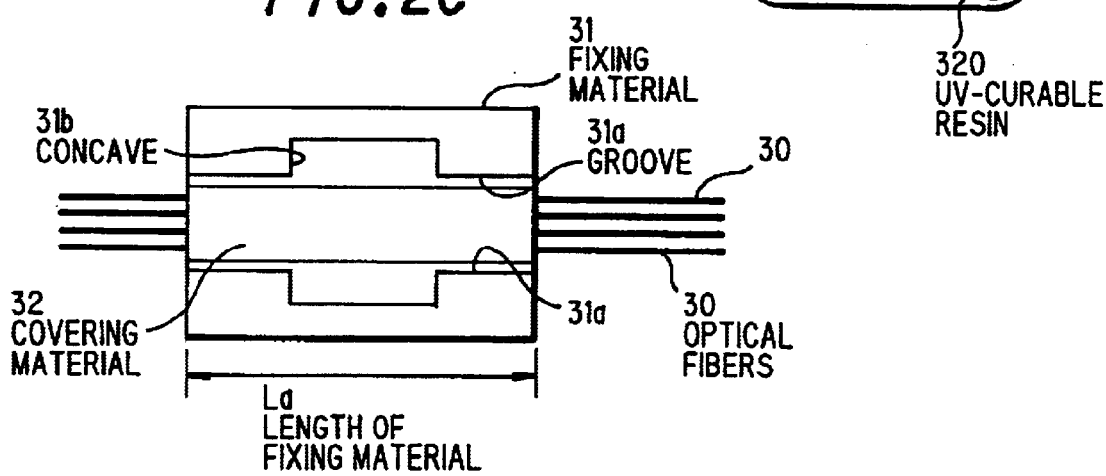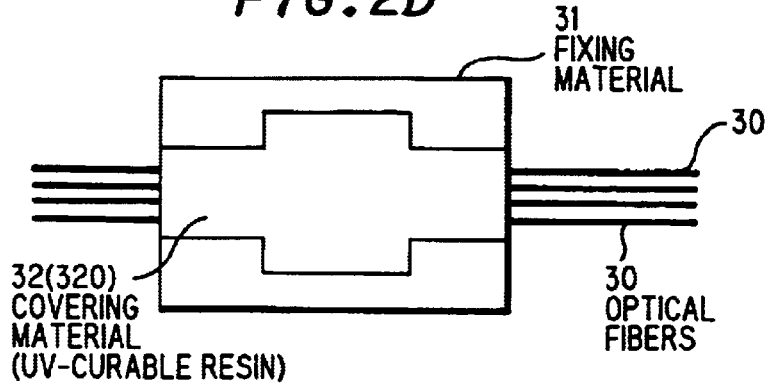

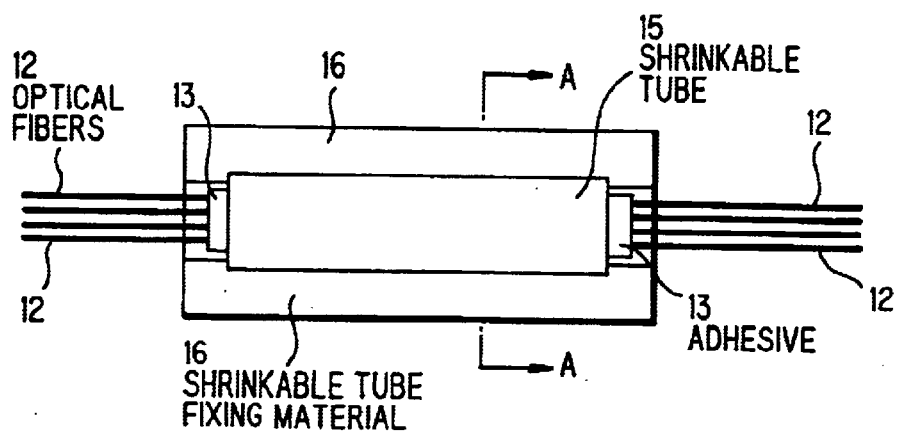
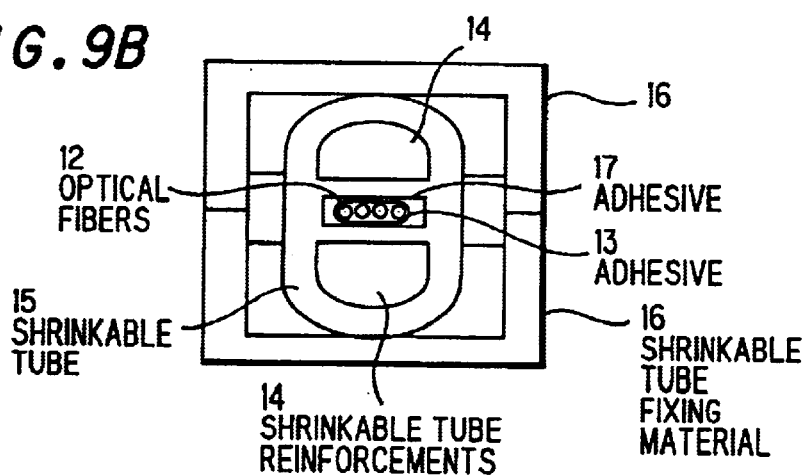
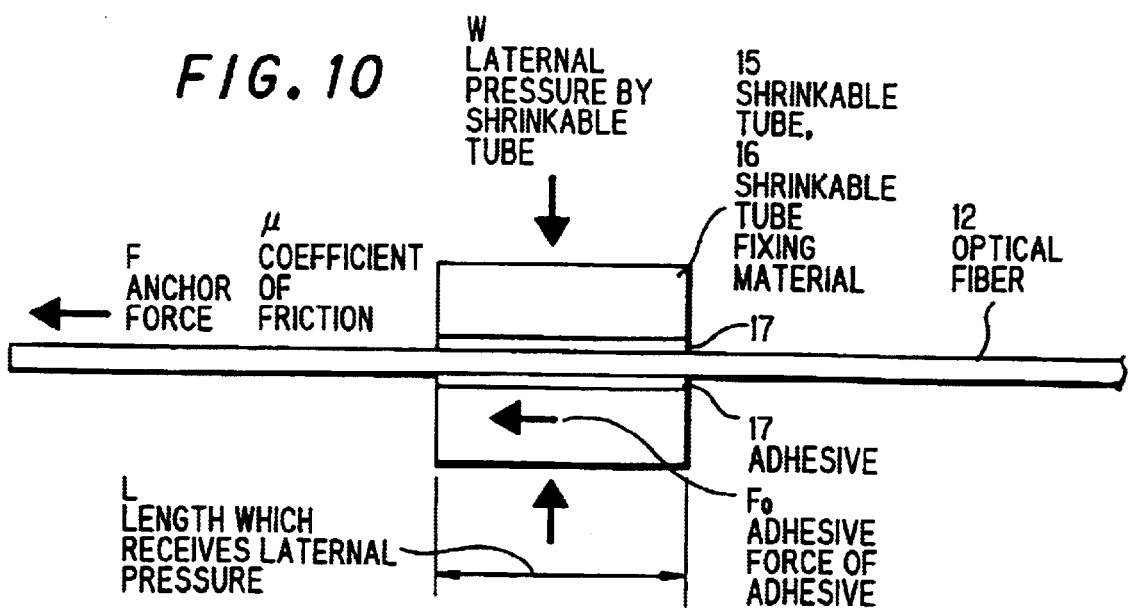

METHOD AND APPARATUS FOR ANCHORING OPTICAL FIBER

FIELD OF THE INVENTION

The invention relates to a method and apparatus for anchoring an optical fiber.

BACKGROUND OF THE INVENTION

FIG. 6 is a cross-sectional view of an example of an optical submarine cable.

The optical submarine cable shown in the drawing comprises: an optical core 1; steel wires 2 provided around the optical core 1; a copper tube 3 provided on the periphery of the steel wires 2; a waterproofing compound 4 provided among the optical core 1, the steel wires 2, and the copper tube 3; and an insulator 5 provided as the outermost layer.

FIG. 7 is a cross-sectional view of an example of the conventional optical core used in the optical submarine cable shown in FIG. 6.

The optical core 1 for an optical submarine cable shown in FIG. 7 comprises: a central tension member 6; a plurality of optical fibers 7 disposed parallel to the central tension member 6 or spirally around the central tension member 6; and a plastic filler 8 filled into gaps between the central tension member 6 and the optical fiber 7 so as to have a circular section.

In anchoring this type of optical submarine cable to a predetermined position, the central tension member 6 of the optical core 1 has hitherto been mechanically fixed onto the predetermined position (coupling with a joint and a repeater not shown).

On the other hand, in order to cope with wavelength multiplexing in an optical transmission system, optical fibers of large mode and low dispersion or low dispersion slope, which are different from the conventional optical fiber, have come into use. Since these optical fibers have a complicate profile, the conventional optical core structure has been likely to increase transmission loss.

A loose tube-type optical core structure as shown in FIG. 8, which is less likely to increase the transmission loss, has become adopted as a measure for reducing the transmission loss.

FIG. 8 is a cross-sectional view of another example of the conventional optical core used in the optical submarine cable shown in FIG. 6.

The optical core 9 shown in FIG. 8 comprises: parallelly or spirally disposed optical fibers 7; a jelly 10 filled around the optical fibers 7 so as to have a circular section; and a plastic tube 11 provided on the periphery of the jelly 10.

Unlike the optical core 1 shown in FIG. 7, the loose tube-type optical core 9 shown in FIG. 8 does not have a central tension member 6, and thus makes it necessary to directly anchor the optical fibers 7.

FIG. 9A is a plan and perspective view of an apparatus to which a conventional optical fiber-anchoring method has been applied. FIG. 9B is a cross-sectional view taken on line A—A of FIG. 9A.

In this apparatus, the anchor position of a plurality of optical fibers 12 is formed in a tape form using an adhesive 13. The optical fibers 12 in their tape portion is inserted into a through hole in a shrinkable tube 15 containing two shrinkable tube reinforcements 14, followed by heating for integration. The shrinkable tube 15 is then placed within a shrinkable tube fixing material 16 which is then fixed to anchor the optical fibers 12. Numeral 17 designates an adhesive applied to the inside of the through hole in the shrinkable tube 15.

In this method, it is considered that the shrinkable tube 15 applies a lateral pressure, the adhesive 17 enhances the coefficient of friction, and, in addition, the adhesive force of the adhesive 17 is utilized. The magnitude and direction of anchor force P or the like in the anchoring apparatus are shown in FIG. 10 and are expressed by the following equation;

$$F = \mu W L + F_0$$

wherein F: anchor force, N;

$\mu$: coefficient of friction;

W: lateral pressure by the shrinkable tube, N/m;

L: length which receives lateral pressure, m; and $F_0$: adhesive force of the adhesive, N.

FIG. 10 is a conceptual view illustrating the anchor force applied to the optical fiber in the anchoring apparatus.

The prior art techniques described above, however, had the following problems.

(1) For the method wherein a lateral pressure is applied to optical fibers to anchor the optical fibers, the lateral pressure is likely to increase the transmission loss.

(2) The anchor force depends upon the coefficient of friction between the fixing material and the optical fibers. Since, however, one of the two members is the optical fiber, it is difficult to provide a large coefficient of friction. Even when an adhesive is applied to enhance the coefficient of friction, good long-term reliability cannot be realized without difficulty.

(3) It is difficult to realize good long-term reliability in terms of the adhesive force of the adhesive.

SUMMARY OF THE INVENTION

Accordingly, it is an object of the invention to solve the above problems of the prior art and to provide an optical fiber-anchoring method and an optical fiber-anchoring apparatus which can realize no significant transmission 1088 of the optical fiber, good long-term reliability, and satisfactory anchor force.

In order to attain the above object, according to the first feature of the invention, an optical fiber-anchoring method comprises the steps of:

fixing a covering material onto the anchor position of at least one optical fiber so as to cover the anchor position, said covering material having been produced from substantially the same material as a jacket material of the optical fiber;

fixing the covering material to the inside of a fixing material for anchoring; and anchoring the fixing material to a predetermined position.

According to the second feature of the invention, an optical fiber-anchoring method comprises the steps of:

fixing a covering material onto the anchor position of a tension member and at least one optical fiber so as to cover the anchor position, said covering material having been produced from substantially the same material as a jacket material of the optical fiber; and anchoring the tension member.

According to the third feature of the invention, an optical fiber-anchoring apparatus for anchoring at least one optical fiber, comprises:

a covering material fixed onto the anchor position of the optical fiber so as to cover the anchor position, said covering material having been produced from substantially the same material as a jacket material of the optical fiber; and a fixing material to which the covering material is fixed and which is anchored to a predetermined position.

According to the optical fiber-anchoring apparatus of the invention, in addition to the above construction, the covering material preferably has a convex and the fixing material has a concave into which the convex is fitted.

According to the fourth feature of the invention, an optical fiber-anchoring apparatus for anchoring at least one optical fiber, comprises:

a tension member arranged in combination with the optical fiber; and a covering material fixed onto the anchor position of the tension member and the optical fiber so as to cover the anchor position, said covering material having been produced from substantially the same material as a jacket material of the optical fiber.

According to the optical fiber-anchoring apparatus of the invention, in addition to the above construction, the covering material preferably has been produced from a UV-curable resin.

Substantially the same material as a jacket material of an optical fiber, for example, a UV-curable resin, is molded into a shape which covers the anchor position of an optical fiber and has in its center a convex for facilitating anchoring. Ultraviolet light is then applied to cure the UV-curable resin to form a covering material. Since this covering material is substantially the same as the jacket material of the optical fiber, the adhesive strength between the optical fiber and the covering material is high. Further, there is no chemical adverse effect on the optical fiber to provide good long-term reliability.

On the other hand, the fixing material is not anchored to the covering material by the lateral pressure, but by a method wherein a groove for receiving the covering material is provided inside the fixing material so that the convex of the covering material is fitted into the groove to apply a stress to the shearing direction, whereby the tensile stress of the optical fiber becomes the shearing force of the covering material in its convex. As a result, the optical fibers can be anchored without substantially increasing the transmission loss.

BRIEF DESCRIPTION OF THE DRAWINGS

The invention will be explained in more detail in conjunction with the appended drawings, wherein:

FIG. 1 is a plan view of a preferred embodiment of the optical fiber-anchoring apparatus according to the invention;

FIGS. 2A to 2D are explanatory views of a preferred embodiment of the optical fiber-anchoring method according to the invention;

FIG. 9A is a plane and perspective view of an apparatus to which the conventional optical fiber-anchoring method has been applied, and FIG. 9B a cross-sectional view taken on line A—A of FIG. 9A; and FIG. 10 is a conceptual view illustrating the anchor force applied to an optical fiber in an anchoring apparatus.

DESCRIPTION OF THE PREFERRED EMBODIMENTS

Figure 3:
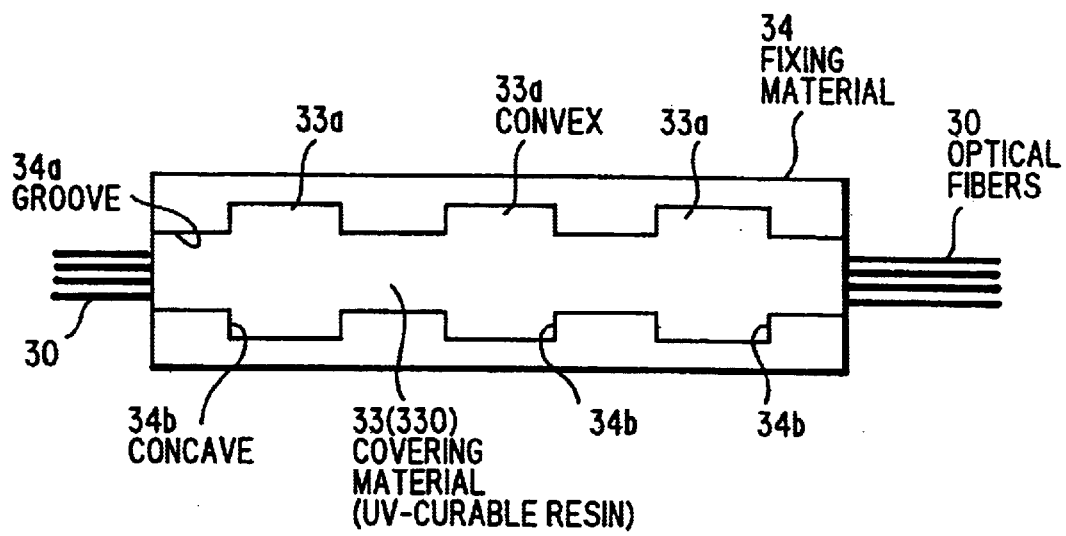
FIG. 3 is a plan view of another preferred embodiment of the optical fiber-anchoring apparatus according to the invention.

The preferred embodiments of the invention will be explained in more detail in conjunction with the accompanying drawings.

FIG. 1 is a plan view of a preferred embodiment of the optical fiber-anchoring apparatus according to the invention.

The optical fiber-anchoring apparatus in the drawing is an optical fiber-anchoring apparatus for anchoring at least one optical fiber, and comprises: a covering material 21 which has been produced from substantially the same material as a jacket material of an optical fiber 20 and is fixed onto the anchor position of the optical fiber 20 so as to cover the anchor position; and a fixing material 22 which is fixed so as to cover the covering material 21 and is anchored to a predetermined position. A chain double-dashed line 23 represents a shear plane of the covering material 21.

The covering material 21 is produced from a UV-curable resin 210 and has a convex 21a. The fixing material 22 has a groove 22a provided with a concave 22b fitted into the convex 21a.

The fixing material 22 is fixed onto a predetermined position to anchor the optical fiber 20. This optical fiber-anchoring apparatus can prevent an increase in lateral pressure applied to the optical fiber 20 and thus does not cause an increase in transmission loss and can realize good long-term reliability.

FIGS. 2A to 2D are explanatory views of a preferred embodiment of the optical fiber-anchoring method according to the invention, wherein FIG. 2B is a cross-sectional view taken on line B—B of FIG. 2A.

It is common practice to simultaneously anchor a plurality of optical fibers. Therefore, anchoring of a plurality of optical fibers will be described. However, it should be noted that this can be applied to anchoring of one optical fiber.

A plurality of optical fibers 30 (although four optical fibers are used in the drawing, the number of optical fibers is not limited) are arranged parallel to one another. A UV-curable resin 320 is thinly coated on the optical fibers 30 by the length La of a fixing material 31 to integrate the optical fibers 30 (FIGS. 2A and 2B).

The UV-curable resin-coated portion in the integrated optical fibers 30 is placed within a groove 31a in a fixing material 31 (FIG. 2c).

A UV-curable resin 320 is filled into the groove 31a and the concave 31b in the fixing material 31. Ultraviolet light is applied to cure the UV-curable resin 320, thereby forming a covering material 32. Thus. the optical fibers 30, the fixing material 31, and the covering material 32 are integrated to prepare an optical fiber-anchoring apparatus (FIG. 2D).

FIG. 3 is a plan view of another preferred embodiment of the optical fiber-anchoring apparatus according to the invention.

The preferred embodiment shown in FIG. 3 is different from the preferred embodiment shown in FIG. 1 in that a plurality of convexes 33a and a plurality of concaves 34b are provided respectively in the covering material 33 and in the groove 34a of the fixing material 34.

In this optical fiber-anchoring apparatus, four optical fibers 30 are fixed to the fixing material 34 having three concaves 34b. After the four optical fibers 30 integrated with one another by a UV-curable resin 330 is placed within the fixing material 34, the UV-curable resin 330 is filled, followed by ultraviolet irradiation to cure the UV-curable resin 330, thereby forming a covering material 33 fixed to the fixing material 34.

According to this optical fiber-anchoring apparatus, since a plurality of convexes 33a and a plurality of concaves 34b (although three covexes and three concaves are provided in the drawing, the number of convexes and concaves is not limited) are provided, the concentration of stress on the optical fibers 30 can be prevented and, in addition, the anchor force is increased, thus contributing to no increase in transmission loss and, in addition, good long-term reliability.

Figure 4A:
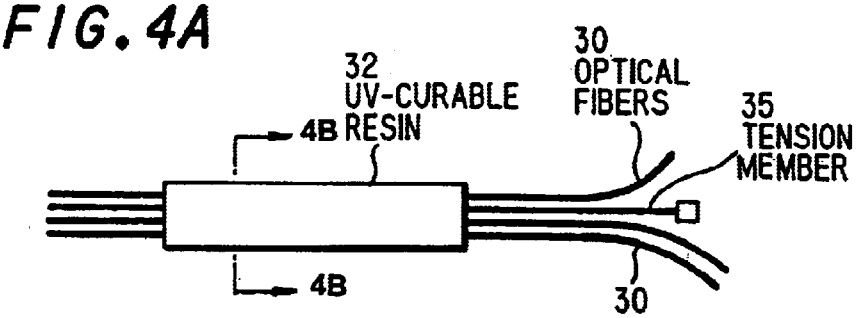
FIG. 4A is a plan view of a further preferred embodiment of the optical fiber-anchoring apparatus according to the invention, and FIG. 4B a cross-sectional view taken on line C—C of FIG. 4A.
Figure 4B:
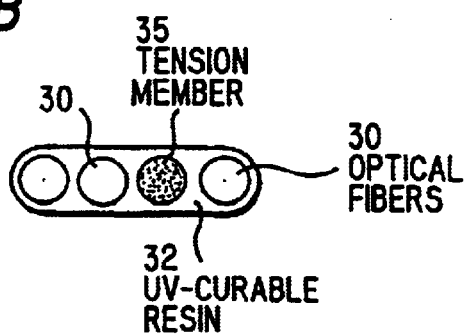

FIG. 4A is a plan view of a further preferred embodiment of the optical fiber-anchoring apparatus according to the invention, and FIG. 4B a cross-sectional view taken on line C—C of FIG. 4A.

The preferred embodiment shown in FIG. 4A is different from the preferred embodiment shown in FIG. 1 in that a plurality of optical fibers 30 are integrated with a tension member 35 with the aid of a UV-curable resin 32.

In this optical fiber-anchoring apparatus, a part of the plurality of the optical fibers 30 and the tension member 35 is covered with a UV-curable resin 32. Ultraviolet light is then applied to cure the UV-curable resin 32, and the end of the tension member 35 is fixed to anchor the optical fibers 30.

Also in this optical fiber-anchoring apparatus. the application of lateral pressure to the optical fibers 30 can be avoided. Therefore, there is no increase in transmission loss, and long-term reliability can be realized.

EXAMPLE

Figure 5A:
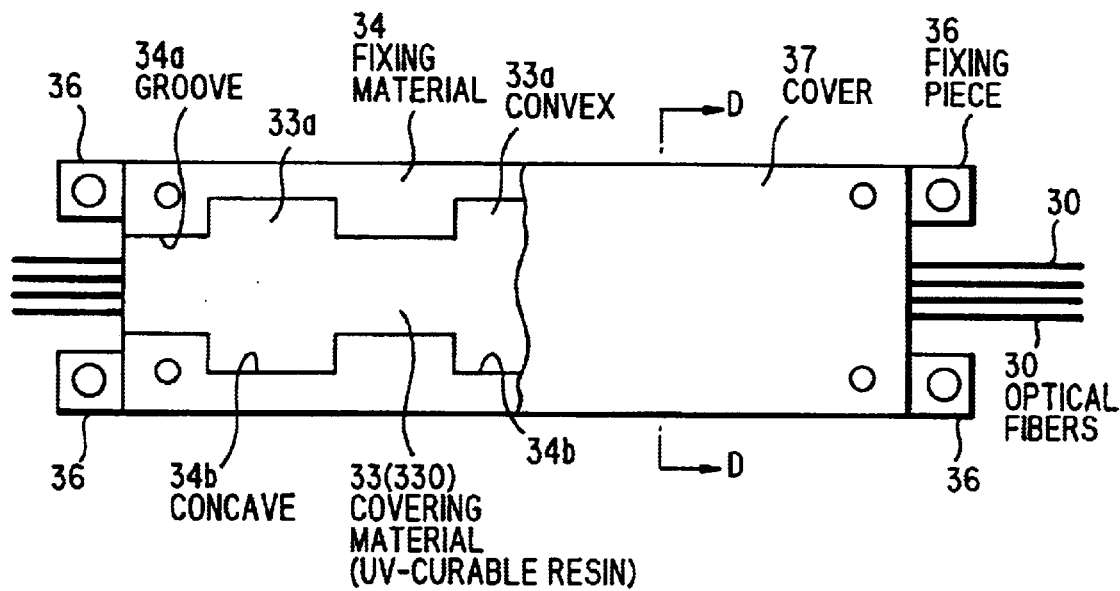
FIG. 5A is a plan view of an example of the optical fiber-anchoring apparatus according to the invention, and FIG. 5B a cross-sectional view taken on line D—D of FIG. 5A.
Figure 5B:
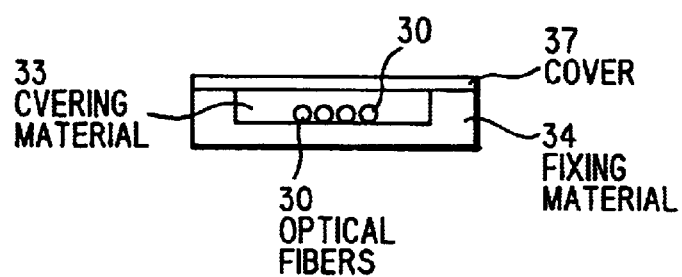
Figure 6:
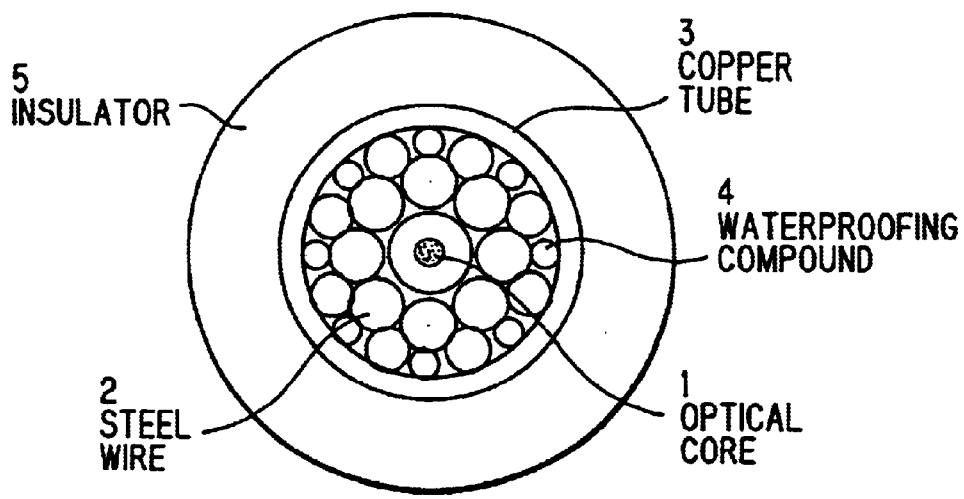
FIG. 6 is a cross-sectional view showing an example of an optical submarine cable.
Figure 7:
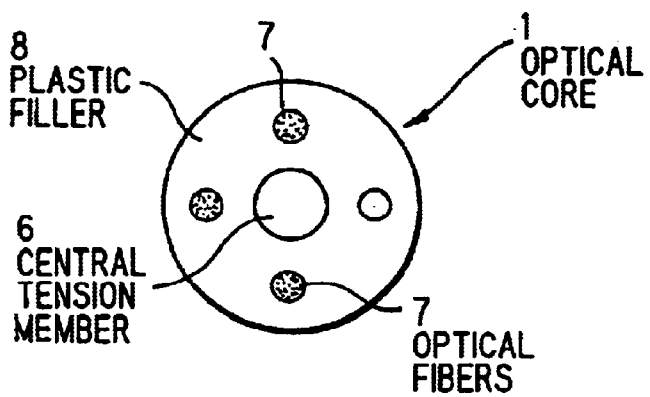
FIG. 7 is a cross-sectional view of an example of a conventional optical core used in the optical submarine cable shown in FIG. 6.
Figure 8:
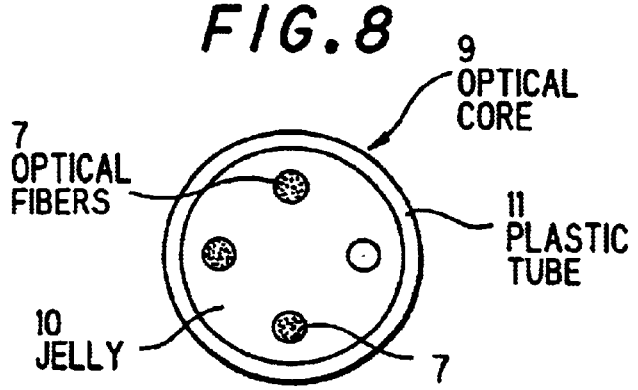
FIG. 8 is a cross-sectional view of another example of the conventional optical core used in the optical submarine cable shown in FIG. 6.

FIG. 5A is a plan view of an example of the optical fiber-anchoring apparatus according to the invention, and FIG. 5B a cross-sectional view taken on line D—D of FIG. 5A.

In this optical fiber-anchoring apparatus, four optical fibers 30 are fixed to the fixing material 34 having three concaves 34b. After the four optical fibers 30, the anchor positions of which have been integrated with one another by a UV-curable resin in the same manner as described above in connection with the optical fiber-anchoring apparatus shown in FIG. 3, are placed within the fixing material 34, the UV-curable resin 330 is filled, followed by ultraviolet irradiation to cure the UV-curable resin 330, thereby forming a covering material 33 fixed to the fixing material 34. A fixing piece 36 having a fixing hole is provided on four corners of the fixing material 34. A cover 37 is provided on the surface (upper side in FIG. 5B) of the fixing material 34 so as to be screwed.

This optical fiber-anchoring apparatus can be fixed to a predetermined position by screwing the holes of the fixing pieces 36.

As described above, the optical fiber-anchoring method and the optical fiber-anchoring apparatus according to the invention, even when optical fibers used have poor mechanical properties such as poor lateral pressure resistance and flexural strength, can provide a necessary anchor force without substantially increasing the transmission loss. That is, the optical fiber-anchoring method and the optical fiber-anchoring apparatus according to the invention can realize no increase in transmission loss and, in addition, good long-term reliability and thus can be applied to the anchoring of optical fibers in wavelength multiplexing-type optical submarine cables, as well as to the anchoring of all optical fibers having poor lateral pressure resistance.

In summary, the invention can provide an optical fiber-anchoring method and an optical fiber-anchoring apparatus which can realize no significant transmission loss of the optical fiber, good long-term reliability, and satisfactory anchor force.

The invention has been described in detail with particular reference to preferred embodiments, but it will be understood that variations and modifications can be effected within the scope of the invention as set forth in the appended claims.

What is claimed is:

1. An optical fiber-anchoring apparatus, for anchoring at least one optical fiber, comprising:

a covering material fixed onto the anchor position of an optical fiber so as to cover the anchor position, said covering material being of a substantially same material as a jacket material of the optical fiber; and a fixing material to which the covering material is fixed and which is anchored to a predetermined position;

wherein the covering material has a convex and the fixing material has a concave into which the convex is fitted.

2. The apparatus according to claim 1, wherein the covering material has been produced from a UV-curable resin.

3. A method for anchoring an optical fiber along a portion of its length, the optical fiber having a jacket formed of a jacket material along a different portion of its length, comprising;

fixing a covering material onto the optical fiber so as to cover the portion of its length, the covering material and the jacket material being a substantially same type material; and fixing the covering material to a fixing material in order to anchor the optical fiber;

wherein the covering material includes a convex portion;

wherein the fixing material includes a concave portion; and wherein the covering material is fixed to the fixing material such that the convex portion is within the concave portion.

4. An optical apparatus, comprising;

an optical fiber;

a covering material fixed to and covering a Portion of the optical fiber;

a jacket material covering a different portion of optical fiber, the jacket material and the covering material being of a substantially same type material; and an anchored fixing material fixed to the covering material;

wherein the covering material includes a convex portion;

wherein the fixing material includes a concave portion; and wherein the convex portion is within the concave portion.

* * * * *